(12) United States Patent
Zhou et al.

(10) Patent No.: US 12,259,756 B2
(45) Date of Patent: Mar. 25, 2025

(54) DISPLAY ASSEMBLY AND DISPLAY DEVICE

(71) Applicant: BOE Technology Group Co., Ltd., Beijing (CN)

(72) Inventors: Pengfei Zhou, Beijing (CN); Shangchieh Chu, Beijing (CN); Baofeng Sun, Beijing (CN); Yanyan Yang, Beijing (CN); Bo Wang, Beijing (CN); Yanli Wang, Beijing (CN); Wei Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 73 days.

(21) Appl. No.: 17/921,604

(22) PCT Filed: Jul. 5, 2021

(86) PCT No.: PCT/CN2021/104429
§ 371 (c)(1),
(2) Date: Oct. 26, 2022

(87) PCT Pub. No.: WO2022/042036
PCT Pub. Date: Mar. 3, 2022

(65) Prior Publication Data
US 2023/0176621 A1 Jun. 8, 2023

(30) Foreign Application Priority Data
Aug. 27, 2020 (CN) .......................... 20210876795.8

(51) Int. Cl.
*G06F 1/16* (2006.01)
(52) U.S. Cl.
CPC .......... *G06F 1/1652* (2013.01); *G06F 1/1616* (2013.01); *G06F 1/1656* (2013.01)

(58) Field of Classification Search
CPC ..................................................... G06F 1/1652
See application file for complete search history.

(56) References Cited

U.S. PATENT DOCUMENTS 10,485,116 B2 * 11/2019 Kim ....................... G06F 1/1641
10,798,831 B2 * 10/2020 Shin ..................... H05K 5/0217
(Continued)

FOREIGN PATENT DOCUMENTS

CN 108582939 A 9/2018
CN 110062077 A 7/2019
(Continued)

OTHER PUBLICATIONS

PCT/CN2021/104429 international search report.

*Primary Examiner* — Adrian S Wilson
(74) *Attorney, Agent, or Firm* — IPro, PLLC (57) ABSTRACT

A display assembly includes: a bearing assembly (1) configured to bear a flexible display module (3) and drive the flexible display module (3) to bend or fold; at least two supporting layers (2) stacked in sequence on the bearing assembly (1), each supporting layer (2) being bendable and having resilience, and each supporting layer (2) being provided with a hollowed-out pattern. The hollowed-out patterns of the supporting layers (2) are different in at least one of the following properties: the area of a hollowed-out part, the shape of the hollowed-out part, and the position of the hollowed-out part. The display assembly further includes the flexible display module (3) located on the side of the at least two supporting layers (2) facing away from the bearing assembly (1).

19 Claims, 7 Drawing Sheets

(56) References Cited

U.S. PATENT DOCUMENTS

| | | | |
|---|---|---|---|
| 11,031,563 B1* | 6/2021 | Li | H10K 77/111 |
| 11,487,327 B2* | 11/2022 | Horiuchi | G06F 1/1641 |
| 11,823,595 B2* | 11/2023 | Wang | G06F 1/1641 |
| 11,977,413 B2* | 5/2024 | Naito | G06F 1/1652 |
| 11,979,995 B2* | 5/2024 | Jiang | G06F 1/1637 |
| 2013/0216740 A1* | 8/2013 | Russell-Clarke | B21D 31/04 |
| | | | 219/121.72 |
| 2018/0317333 A1* | 11/2018 | Bi | G06F 1/1652 |
| 2019/0132947 A1* | 5/2019 | Koo | G09F 9/301 |
| 2021/0007229 A1* | 1/2021 | Gu | G06F 1/1601 |
| 2021/0165447 A1 | 6/2021 | Wang et al. | |
| 2021/0165454 A1* | 6/2021 | Dong | G06F 1/1652 |
| 2022/0103670 A1* | 3/2022 | Liao | H04M 1/0216 |

FOREIGN PATENT DOCUMENTS

| | | |
|---|---|---|
| CN | 110610979 A | 12/2019 |
| CN | 110767095 A | 2/2020 |
| CN | 110767098 A | 2/2020 |
| CN | 110827693 A | 2/2020 |
| CN | 111312794 A | 6/2020 |
| CN | 111862824 A | 10/2020 |
| CN | 212782510 U | 3/2021 |
| KR | 20190025799 A | 3/2019 |

\* cited by examiner

DISPLAY ASSEMBLY AND DISPLAY DEVICE

CROSS-REFERENCE OF RELATED APPLICATIONS

The present application is a national phase entry under 35 U.S.C. § 371 of International Application No. PCT/CN2021/104429, filed on Jul. 5, 2021, which claims priority of Chinese Patent Application No. 202010876795.8, filed with the China National Intellectual Property Administration on Aug. 27, 2020 and entitled "Display Assembly and Display Device", the entire contents of which are hereby incorporated by reference.

FIELD

The present application relates to the field of display technology, and in particular, to a display assembly and a display device.

BACKGROUND

As the flexible screen technology becomes more and more mature, the new applications thereof are also becoming more and more widespread, such as folding or curling screens. The current common flexible folding screen or curling screen needs a bearing assembly to provide the bending of the whole machine. The support scheme between the flexible screen and the bearing assembly has always been the focus of the industry. This support must not only ensure the flatness when the screen is unfolding, but also have the stretchability during bending. Therefore, how to improve the support scheme between the flexible screen and the bearing assembly is an important research direction to improve the performance of the flexible screen.

BRIEF SUMMARY

The present application discloses a display assembly and a display device, for the purpose of providing a support scheme for a flexible screen, so as to improve the bending and support performance of the flexible screen.

A display assembly includes:

a bearing assembly configured to bear a flexible display module and drive the flexible display module to bend or fold;

at least two supporting layers stacked in sequence on the bearing assembly, wherein each supporting layer is bendable and has resilience, and each supporting layer is provided with a hollowed-out pattern; and hollowed-out patterns of the supporting layers are different in at least one of following properties: an area of a hollowed-out part, a shape of the hollowed-out part, and a position of the hollowed-out part; and the flexible display module located on a side of the at least two supporting layers away from the bearing assembly.

Optionally, the hollowed-out pattern of each supporting layer includes at least one hollowed-out region that includes a plurality of hollowed-out parts distributed in an array.

Optionally, areas of hollowed-out parts in the supporting layers are different.

Optionally, the areas of the hollowed-out parts in the supporting layers increase sequentially in a direction from an inner side to an outer side of bending or folding of the flexible display module.

Optionally, the hollowed-out parts in the supporting layers have an one-to-one correspondence, and orthographic projections of hollowed-out parts corresponding to each other on the flexible display module at least partially overlap.

Optionally, centers of the orthographic projections of the hollowed-out parts corresponding to each other on the flexible display module coincide.

Optionally, an orthographic projection of a hollowed-out part of a supporting layer close to the inner side of bending or folding on the flexible display module is located in an orthographic projection of a hollowed-out part of a supporting layer close to the outer side of bending or folding on the flexible display module.

Optionally, orthographic projections of hollowed-out parts in the supporting layers on the flexible display module are staggered.

Optionally, shapes and areas of the hollowed-out parts in the supporting layers are same.

Optionally, shapes of hollowed-out parts in the supporting layers are same; and the shapes of the hollowed-out parts are a strip shape of which an extending direction is consistent with an axis direction of bending or folding of the flexible display module.

Optionally, shapes of hollowed-out parts in the supporting layers are different; and the shapes of the hollowed-out parts include at least one of strip shape, rectangle, rhombus, or oval.

Optionally, the display assembly further includes a foam adhesive layer located between the at least two supporting layers and the flexible display module, wherein one supporting layer close to the flexible display module is fitted to the flexible display module through the foam adhesive layer; one supporting layer close to the bearing assembly is fitted to the bearing assembly through glue.

Optionally, adjacent supporting layers are fitted through glue, or the at least two supporting layers are an integrally-formed structure.

Optionally, the bearing assembly includes a first middle frame, a second middle frame, and a rotating shaft assembly located between the first middle frame and the second middle frame, wherein the first middle frame and the second middle frame can be respectively rotated around the rotating shaft assembly to realize folding or unfolding;

the at least two supporting layers include two supporting layers.

Optionally, a thickness of each supporting layer is 0.01 mm-0.15 mm.

Optionally, each supporting layer is a stainless steel material layer.

A display device includes the display assembly described in any one of the above implementations.

DETAILED DESCRIPTION OF THE EMBODIMENTS

The technical solutions in the embodiments of the present application will be described clearly and completely below in combination with the accompanying drawings in the embodiments of the present application. Obviously the described embodiments are only a part of the embodiments of the present application but not all the embodiments. Based upon the embodiments of the present application, all of other embodiments obtained by those ordinary skilled in the art without creative work pertain to the protection scope of the present application.

Figure 1:
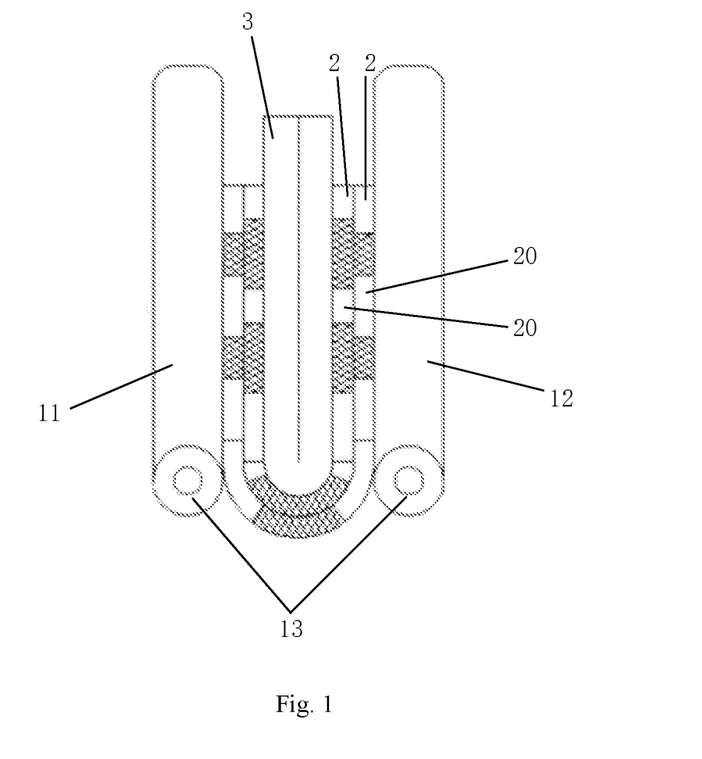
FIG. 1 is a schematic diagram of a cross-sectional structure of a display assembly in the inward folded state according to an embodiment of the present application.
Figure 2:
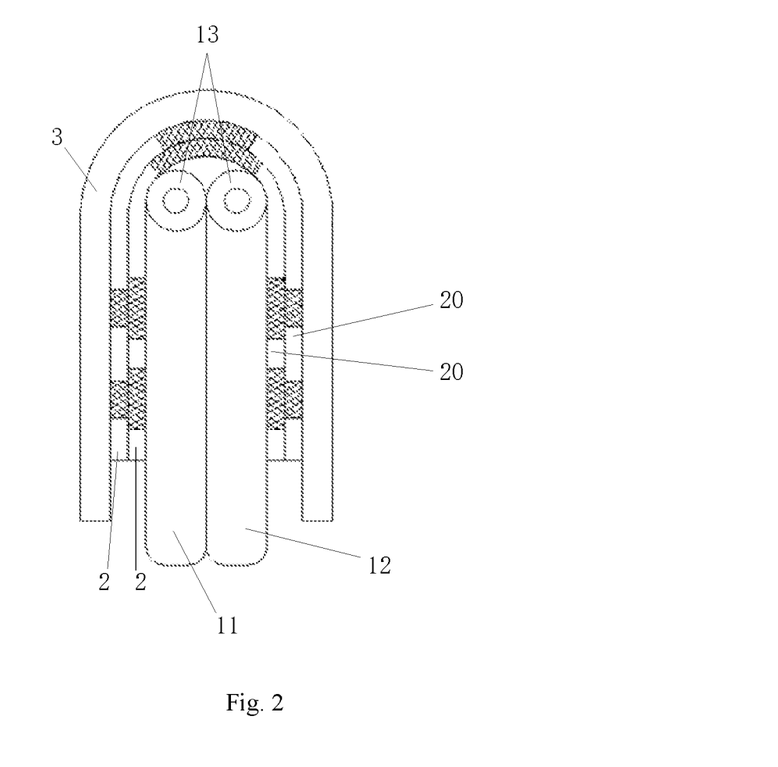
FIG. 2 is a schematic diagram of a cross-sectional structure of a display assembly in the outward folded state according to another embodiment of the present application.
Figure 4:
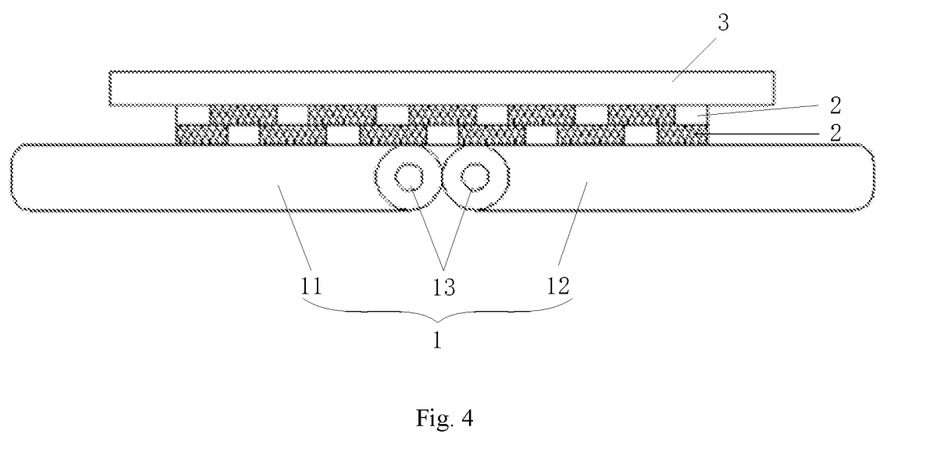
FIG. 4 is a structural schematic diagram of a display assembly in the flattened state according to another embodiment of the present application.

As shown in FIG. 1, FIG. 2 and FIG. 4, embodiments of the present application provide a display assembly, including:

a bearing assembly 1 configured to bear a flexible display module 3 and drive the flexible display module 3 to bend or fold;

at least two supporting layers 2 stacked in sequence on the bearing assembly 1, wherein each supporting layer 2 is bendable and has resilience, and each supporting layer 2 is provided with a hollowed-out pattern; and hollowed-out patterns of the supporting layers 2 are different in at least one of following properties: an area of a hollowed-out part 20, a shape of the hollowed-out part 20, and a position of the hollowed-out part 20; and the flexible display module 3 located on a side of the at least two supporting layers 2 away from the bearing assembly 1.

In the display assembly provided by the embodiments of the present application, the entire layer of supporting layers 2 is used as a screen support structure between the bearing assembly 1 and the flexible display module 3, and can achieve the good bending performance in the bent or folded rotating shaft region and provide the good flatness when the screen is unfold, and is a flexible screen support scheme with better performance and yield. Moreover, compared with only a single supporting layer 2, at least two supporting layers 2 develop towards the 3D direction, that is, the support for the flexible screen can be improved by stacking a plurality of layers, and the bending performance and support performance can also be flexibly adjusted by different settings of the hollowed-out parts 20 of the supporting layers 2, further effectively improving the overall bending performance and support performance of the support, thereby achieving a more excellent technical effect of screen support, and meeting the demand of the curved and foldable terminal display product on the support structure of the screen module.

In some embodiments, each supporting layer 2 is a stainless steel material layer (SUS). The stainless steel material layer (SUS) is bendable and has resilience, and has good characteristics such as high hardness, good toughness, high temperature resistance and corrosion resistance, and is a good material for the supporting layer 2 of the flexible screen.

In some embodiments, as shown in FIG. 1, FIG. 2 and FIG. 4, the display assembly is a foldable display assembly. The bearing assembly 1 includes a first middle frame 11, a second middle frame 12, and a rotating shaft assembly 13 located between the first middle frame 11 and the second middle frame 12. The first middle frame 11 and the second middle frame 12 can be respectively rotated around the rotating shaft assembly 13 to realize folding or unfolding, to drive the flexible display module 3 to fold.

Of course, the display assembly may also be a bendable assembly or a rollable assembly, so as to drive the flexible display module 3 to bend or roll.

Exemplarily, the at least two supporting layers 2 may include two supporting layers 2; or the at least two supporting layers 2 may include three or four layers, and certainly may include more supporting layers 2.

Exemplarily, the thickness of each supporting layer is 0.01 mm-0.15 mm.

The thickness of each supporting layer 2 and the number of supporting layers 2 may be selected according to the thickness requirement of the actual support and the processing technology level of the supporting layers 2 and other factors.

In some embodiments, the hollowed-out pattern of each supporting layer 2 includes at least one hollowed-out region that includes a plurality of hollowed-out parts 20 distributed in an array.

Figure 6:
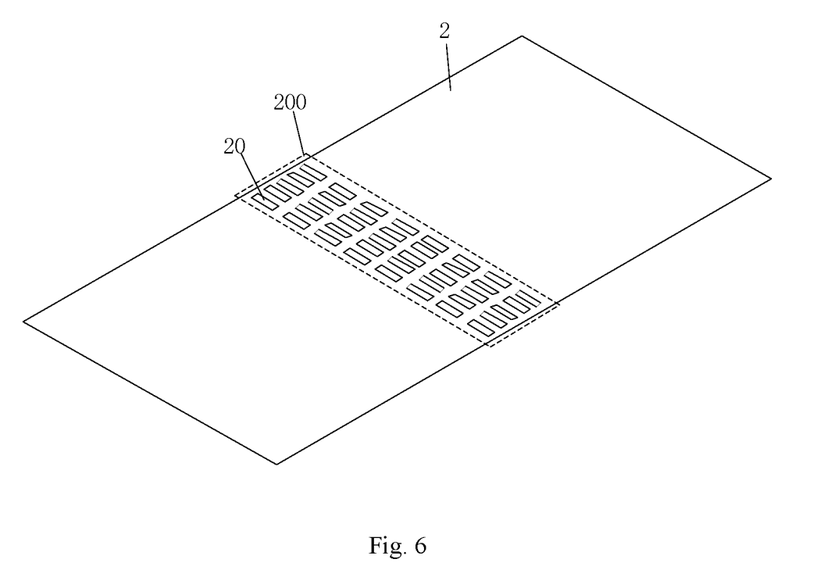
FIG. 6 is a structural schematic diagram of a supporting layer in a display assembly according to an embodiment of the present application.
Figure 7:
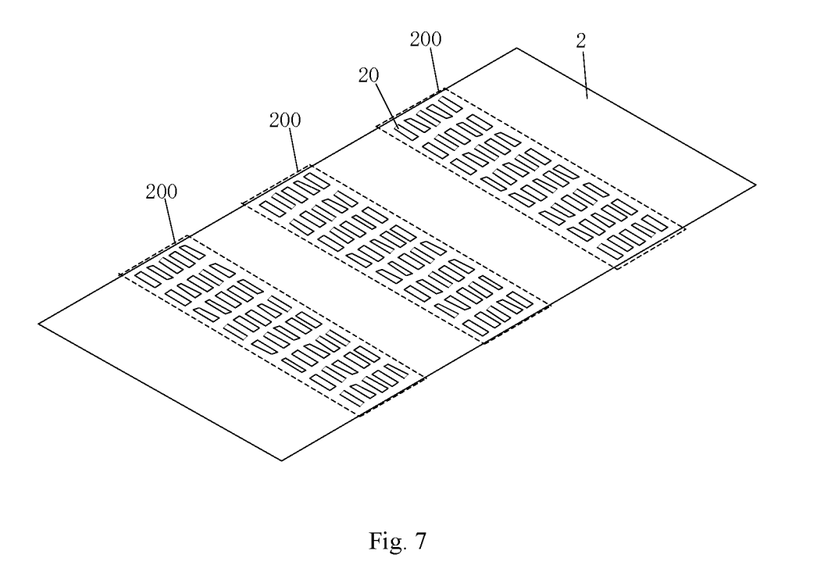
FIG. 7 is a structural schematic diagram of a supporting layer in a display assembly according to another embodiment of the present application.

Exemplarily, the hollowed-out region of the supporting layer 2 is a region composed of hollowed-out parts 20 distributed in an array. For example, the region composed of hollowed-out parts 20 included in each dotted frame in FIG. 6 and FIG. 7 is a hollowed-out region 200. For example, he hollowed-out region 200 may be arranged at the position where the supporting layer 2 needs to be bent or folded, and the number and arrangement positions of hollowed-out regions 200 may correspond to the number and positions of bending regions of the flexible display module. For example, as shown in FIG. 6, the flexible display module is a foldable display device with one bending part, and then the supporting layer 2 may be provided with one hollowed-out region 200 at the position of the bending part. Alternatively, as shown in FIG. 7, the flexible display module has three bending parts, and then the supporting layer 2 may be respectively provided with three hollowed-out regions 200 at the positions of the three bending parts. Of course, the hollowed-out parts 20 may also be provided on the entire region (bending region and non-bending region) of the supporting layer 2, as shown in FIG. 1, FIG. 2 and FIG. 4. At this time, the hollowed-out parts 20 on the entire region of the supporting layer 2 constitute a hollowed-out region.

The hollowed-out parts 20 distributed in the array can not only ensure the overall support performance of each supporting layer 2, but also enable each supporting layer 2 to have the better flexibility to improve the bending and folding performance. Furthermore, the pattern of the hollowed-out parts 20 distributed in the array is relatively simple and is convenient for processing and manufacturing, and the cost is relatively low.

Exemplarily, the shapes of the hollowed-out parts 20 in respective supporting layers 2 may be the same, and e.g., may be a strip shape, such as the hollowed-out parts 20 shown in FIGS. 3A and 3B and FIGS. 5A and 5B. The extending direction of the strip shape is consistent with the axis direction of bending or folding of the flexible display module. That is, the hollowed-out part 20 in each supporting layer 2 is a strip-shaped hollowed-out part 20, of which the extending direction is consistent with the axis direction of bending or folding of the flexible display module. The 'consistent direction' includes complete parallelism but also allows a certain error. For example, the case where the included angle between two directions is less than a certain angle can be called 'consistent', for example, the included angle is less than 10 degrees.

Taking the foldable display assembly as an example, as shown in FIG. 1, FIG. 2 and FIG. 4, the first middle frame 11 and the second middle frame 12 are rotated around the rotating shaft assembly 13 to drive the flexible display module 3 to fold or unfold, so the axis direction of bending or folding of the flexible display module 3 is a direction parallel to the rotating shaft in the rotating shaft assembly 13. Alternatively, when the display assembly is a rollable assembly, the above-mentioned axis direction is a direction parallel to the scroll shaft.

The consistency of the extending direction of the hollowed-out part with the axis direction of bending or folding can effectively improve the bending and folding performance of the supporting layer, and thus improve the overall bending yield and effect of the display assembly.

In some embodiments, the areas of the hollowed-out parts 20 in respective supporting layers 2 are different.

Figure 3A:
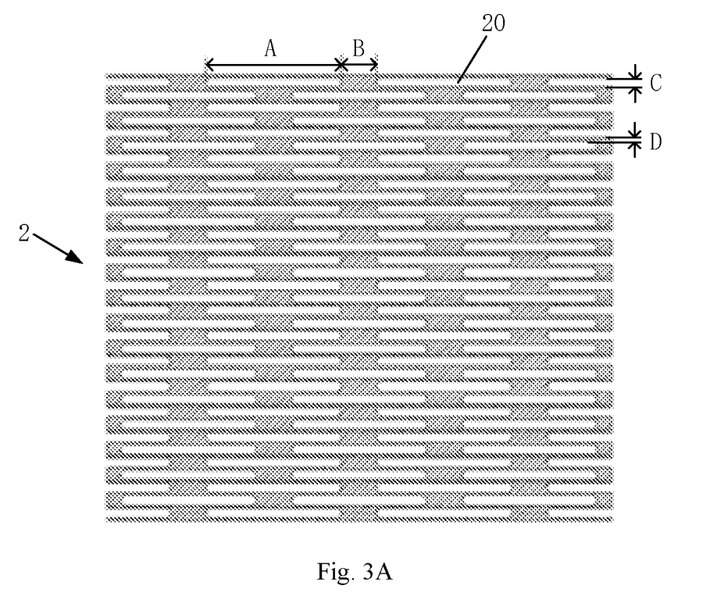
FIGS. 3A and 3B are structural schematic diagrams of two supporting layers in a display assembly according to an embodiment of the present application.
Figure 3B:
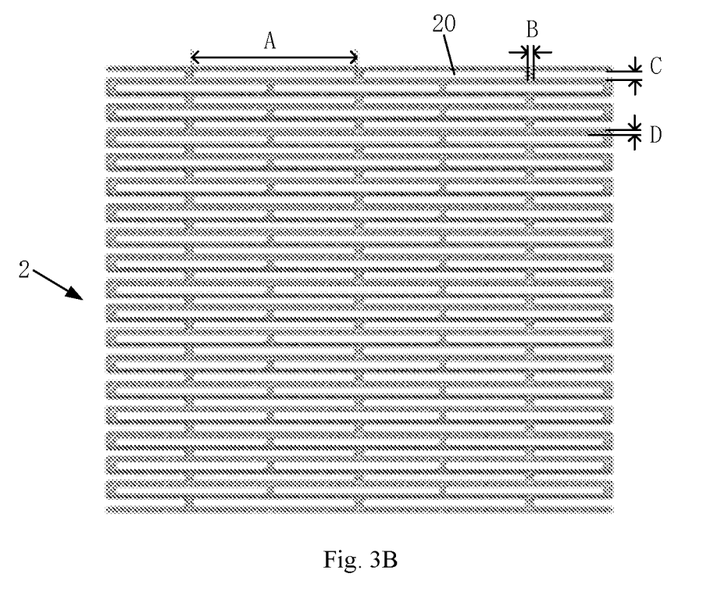

For example, as shown in FIGS. 3A and 3B, the hollowed-out parts 20 of the supporting layers 2 are strip-shaped hollowed-out parts 20 of which the extending direction is consistent with the axis direction of bending or folding. The strip-shaped hollowed-out parts 20 of the supporting layers 2 have the same width C and different lengths A and thus have different areas.

Of course, the strip-shaped hollowed-out parts 20 of the supporting layers 2 may have different widths C, and the lengths A may be the same or different, as shown in FIG. 1 and FIG. 2, so that the areas of the hollowed-out parts 20 are different.

The larger the area of the hollowed-out part 20 of each hollowed-out region 200 in the supporting layer 2 is, the better the bending performance thereof is. Furthermore, the area of the hollowed-out part 20 can be designed according to the requirement on the bending performance of each supporting layer 2.

Exemplarily, as shown in FIG. 1 and FIG. 2, the areas of the hollowed-out parts 20 in the supporting layers 2 increase sequentially in the direction from the inner side to the outer side of bending or folding of the flexible display module 3. The 'inner side' refers to the side of the surface that is hidden inside after being bent or folded; and the 'outer side' refers to the side of the surface that is exposed to the outside after being bent or folded.

Exemplarily, as shown in FIG. 1 to FIG. 3B, the hollowed-out parts 20 in the respective supporting layers 2 have an one-to-one correspondence, and the orthographic projections of the hollowed-out parts 20 corresponding to each other on the flexible display module 3 at least partially overlap. That is, the distribution positions of the hollowed-out parts 20 of the respective supporting layers 2 are the same.

For example, the centers of the orthographic projections of the hollowed-out parts 20 corresponding to each other in the supporting layers 2 on the flexible display module 3 coincide. Alternatively, at least partial borders of the hollowed-out parts 20 corresponding to each other in the respective supporting layers 2 are aligned.

For example, taking the strip-shaped hollowed-out part as an example, as shown in FIGS. 3A and 3B, the strip-shaped hollowed-out parts 20 of the respective supporting layers 2 have the same width C and different lengths A. The hollowed-out parts corresponding to each other in the respective supporting layers 2 have two borders aligned in the width C direction. Midpoints of the hollowed-out parts corresponding to each other in the respective supporting layers 2 are aligned in the length A direction. Of course, both the lengths A and widths C of the strip-shaped hollowed-out parts 20 of the respective supporting layers 2 may also be different, and at this time, the midpoints of the hollowed-out parts 20 corresponding to each other in the respective supporting layers 2 are aligned in both the length A direction and the width C direction.

Exemplarily, as shown in FIG. 1 and FIG. 2, the orthographic projection of a hollowed-out part 20 of the supporting layer 2 close to the inner side of bending or folding on the flexible display module 3 is located in the orthographic projection of a hollowed-out part 20 of the supporting layer 2 close to the outer side of bending or folding on the flexible display module 3.

When the display assembly is bent or folded, as shown in FIG. 1 and FIG. 2, the flexible display module 3 and the supporting layers 2 are bent or folded along with the bearing assembly 1. Among the supporting layers 2, the supporting layer 2 close to the outer side of bending or folding has a larger tensile deformation and has a higher requirement on the tensile performance, while the supporting layer 2 close to the inner side of bending or folding has a lower requirement on the tensile performance. In an implementation of the present application, the supporting layer 2 close to the outer side of bending or folding has a relatively larger area of the hollowed-out part(s) 20, while the supporting layer 2 close to the inner side of bending or folding has a relatively smaller area of the hollowed-out part(s) 20, so that the bending performance of the supporting layers 2 can not only be improved, but also the good support can be provided for the flexible display module 3 when the screen is unfolded.

The foldable display assembly is taken as an example, for example, the foldable display assembly includes two supporting layers 2.

As shown in FIG. 1, in the inward folded state, the flexible display module 3 and the supporting layers 2 are located between the first middle frame 11 and the second middle frame 12 of the bearing assembly 1. Among two supporting layers 2, the supporting layer 2 close to the bearing assembly 1 is located on the outer side of the folding and has a greater requirement on the tensile performance, and this supporting layer 2 has a larger hollowed-out part 20, while the supporting layer 2 close to the flexible display module 3 is located on the inner side of the folding and has a relatively reduced folding requirement, and this supporting layer 2 has a smaller hollowed-out part 20 and mainly provides support when the screen is unfolded.

As shown in FIG. 2, in the outward folded state, the flexible display module 3 and the supporting layers 2 are sequentially wrapped on the outside of the first middle frame 11 and the second middle frame 12. Among two supporting layers 2, the supporting layer 2 close to the flexible display module 3 is located on the outer side of the folding and has a greater requirement on the tensile performance, and this supporting layer 2 has a larger hollowed-out part 20, while the supporting layer 2 close to the bearing assembly 1 is located on the inner side of the folding and has a relatively reduced folding requirement, and this supporting layer 2 has a smaller hollowed-out part 20 and mainly provides support when the screen is unfolded.

Further, taking a foldable mobile phone as an example, the display assembly of the foldable mobile phone includes two supporting layers 2, as shown in FIGS. 3A and 3B. The hollowed-out parts 20 of the supporting layers 2 are of strip shape with the same extending direction as the folding axis. The extending direction of the strip-shaped hollowed-out parts 20 is the row direction, and the hollowed-out parts 20 in adjacent rows are staggered from each other. For example, the length A of the hollowed-out part 20 may be in the range of 1 mm to 10 mm, the width C of the hollowed-out part 20 may be in the range of 0.1 mm to 1 mm, the distance B between adjacent hollowed-out parts 20 in the length direction of the hollowed-out parts 20 may be 0.1 mm to 10 mm, and the distance D between hollowed-out parts 20 in adjacent rows in the width direction of the hollowed-out parts 20 may be 0.1 mm to 1 mm. For example, the patterns of the hollowed-out parts 20 of the two supporting layers 2 may be respectively shown in FIGS. 3A and 3B. As shown in FIG. 3A, the length A of the hollowed-out part 20 in one supporting layer 2 is 4.3 mm, and the distance B between adjacent hollowed-out parts 20 in the length direction of the hollowed-out parts 20 is 1.1 mm. As shown in FIG. 3B, the length A of the hollowed-out part 20 in the other supporting layer 2 is 5.3 mm, and the distance B between adjacent hollowed-out parts 20 in the length direction of the hollowed-out parts 20 is 0.1 mm. The widths C of the hollowed-out parts 20 of the two supporting layers 2 are equal and the distances D between hollowed-out parts 20 in adjacent rows in the width direction in the two supporting layers 2 are equal. For example, the width C of the hollowed-out part 20 may be 0.2 mm, and the distance D between adjacent hollowed-out parts 20 in the width direction may be 0.1 mm.

Figure 5A:
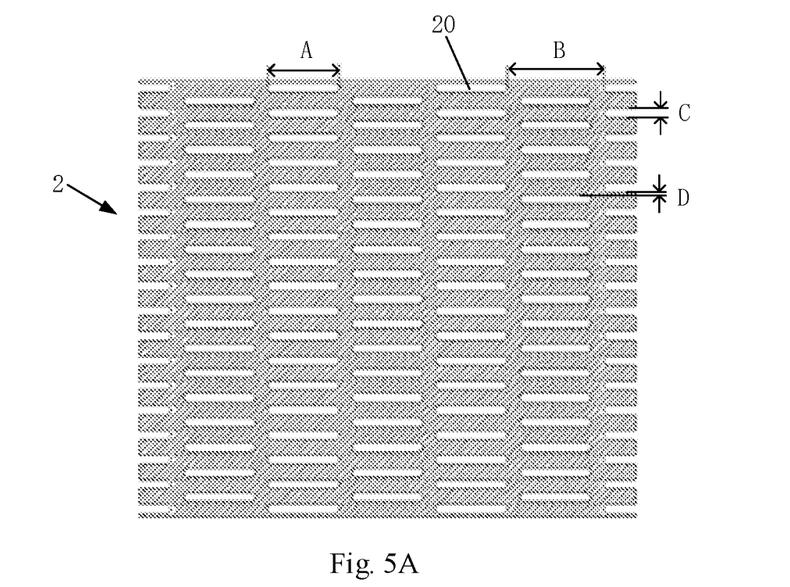
FIGS. 5A and 5B are structural schematic diagrams of two supporting layers in a display assembly according to another embodiment of the present application.
Figure 5B:
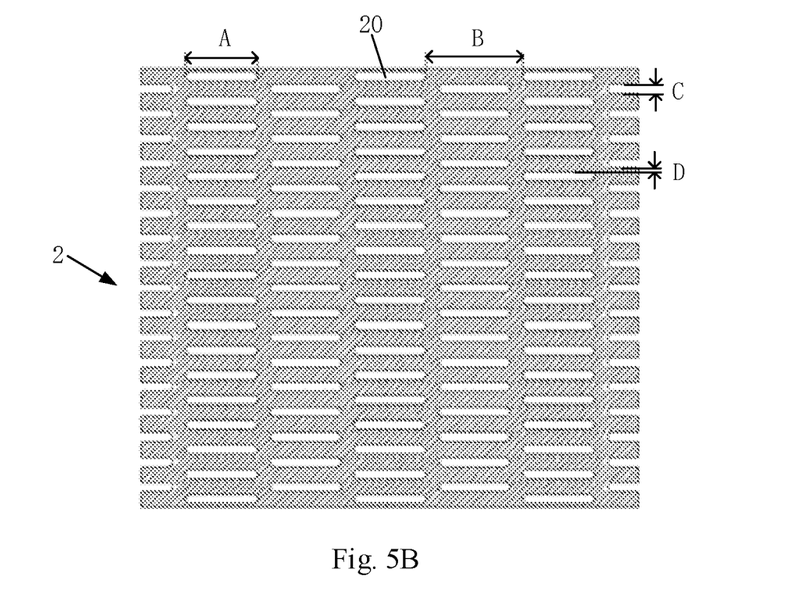

In other embodiments, as shown in FIGS. 5A and 5B, the hollowed-out region of each supporting layer 2 includes a plurality of hollowed-out parts 20 distributed in an array, but the distribution positions of the hollowed-out parts 20 of the respective supporting layers 2 are different.

Exemplarily, as shown in FIG. 4, the orthographic projections of the hollowed-out parts 20 in the supporting layers 2 on the flexible display module 3 are staggered. That is, the hollowed-out parts 20 in the supporting layers 2 are stacked alternately and do not overlap with each other.

For example, the patterns of the hollowed-out parts 20 in the one supporting layer 2 may be designed to complement to the patterns of the hollowed-out parts 20 in another supporting layer 2.

The hollowed-out parts of the respective supporting layers are staggered, and the patterns of the hollowed-out parts have a complementary effect. This solution can be applicable to the display assembly folded inward and outward, and the complementary pattern design can solve the defect in the inadequate support of a single supporting layer and also improve the overall bending performance of each supporting layer.

Exemplarily, as shown in FIGS. 5A and 5B, the shapes and areas of the hollowed-out parts 20 in the supporting layers 2 are the same. For example, the hollowed-out parts 20 of the supporting layers 2 are strip-shaped hollowed-out parts 20 of which the extending direction is consistent with the axis direction of bending or folding, and the strip-shaped hollowed-out parts 20 of the supporting layers 2 have the same length A and width C. Of course, in other embodiments, the shapes and/or areas of the hollowed-out parts 20 of the respective supporting layers 2 may also be different.

The hollowed-out parts 20 of the supporting layers 2 have the same shape and area, which can ensure the good complementarity between the supporting layers 2, and facilitate the unified processing and manufacture of the supporting layers 2 to reduce the cost.

For example, taking a foldable mobile phone as an example, the display assembly of the foldable mobile phone includes two supporting layers 2, as shown in FIGS. 5A and 5B. The hollowed-out parts 20 of the two supporting layers 2 have the same shape and area, but the hollowed-out parts 20 of the two layers are staggered. The hollowed-out parts 20 of each supporting layer 2 are of strip shape with the same extending direction as the folding axis. The extending direction of the strip-shaped hollowed-out parts 20 is the row direction, and the hollowed-out parts 20 in adjacent rows are staggered from each other. For example, the length A of the hollowed-out part 20 may be in the range of 1 mm to 10 mm, the width C of the hollowed-out part 20 may be in the range of 0.1 mm to 1 mm, the distance B between adjacent hollowed-out parts 20 in the length direction of the hollowed-out parts 20 may be 1 mm to 10 mm, and the distance D between hollowed-out parts 20 in adjacent rows in the width direction of the hollowed-out parts 20 may be 0.1 mm to 1 mm. For example, in each supporting layer 2, the length A of the hollowed-out part 20 is 2.3 mm, the distance B between adjacent hollowed-out parts 20 in the length direction of the hollowed-out parts 20 is 3.1 mm, the width C of the hollowed-out part 20 is 0.2 mm, and the distance D between hollowed-out parts 20 in adjacent rows in the width direction is 0.1 mm.

Figure 8:
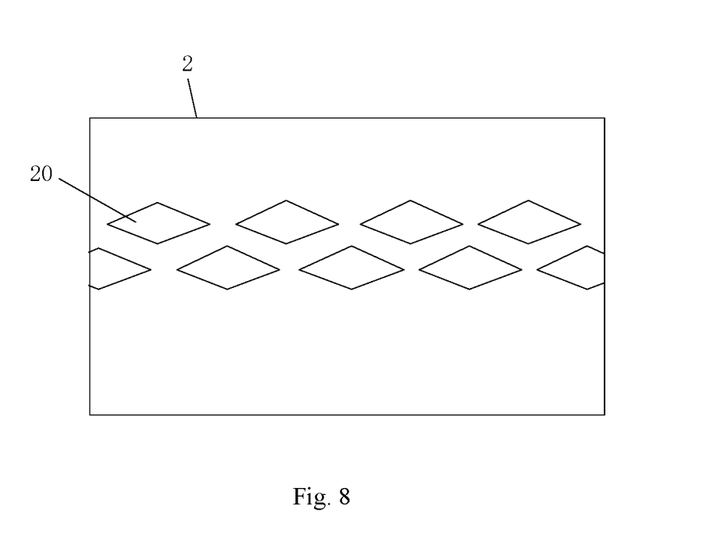
FIG. 8 is a structural schematic diagram of a supporting layer in a display assembly according to another embodiment of the present application.
Figure 9:
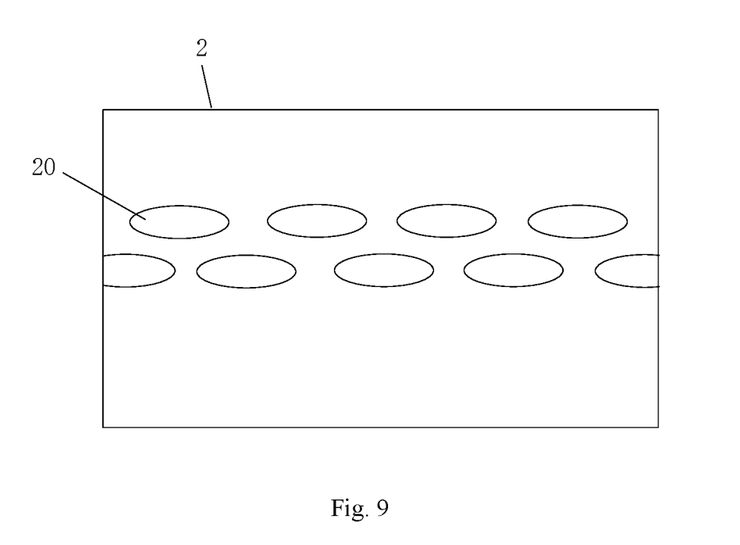
FIG. 9 is a structural schematic diagram of a supporting layer in a display assembly according to another embodiment of the present application.

In some embodiments, the shapes of the hollowed-out parts in the supporting layers may also be different. The shapes of the hollowed-out parts may include at least one of strip shape (as shown in FIGS. 3A and 3B and FIGS. 5A and 5B), rectangle (as shown in FIG. 6 and FIG. 7), rhombus (as shown in FIG. 8), oval (as shown in FIG. 9), etc.

The shape of the hollowed-out part has an extending direction, for example, the extending direction of the long side of the strip shape or rectangle, the extending direction of the longer diagonal line of the rhombus, or the direction of the long axis of the oval. The hollowed-out parts in these shapes are arranged in the same way as the strip-shaped hollowed-out parts in the above embodiments, and the extending direction thereof is consistent with the extending direction of the rotating shaft of the flexible display panel. Of course, in the present application, the hollowed-out parts 20 of the supporting layers 2 are not limited to the above-mentioned shapes, and for example, the shapes may also include unconventional shapes such as S-shape and Y-shape.

In some embodiments, as shown in FIG. 1, FIG. 2 and FIG. 4, the display assembly provided by the embodiments of the present application further includes a foam adhesive layer (not shown in the figure) located between the at least two supporting layers 2 and the flexible display module 3. One supporting layer 2 close to the flexible display module 3 is fitted to the flexible display module 3 through the foam adhesive layer.

Further, one supporting layer 2 close to the bearing assembly 1 may be fitted to the bearing assembly 1 through glue. For example, one supporting layer 2 close to the bearing assembly 1 is bonded with the first middle frame 11, the second middle frame 12 and the rotating shaft assembly 13 through glue or double-sided tape.

Exemplarily, the adjacent supporting layers 2 may be fitted through glue, that is, all the supporting layers 2 are bonded to form an entirety. Alternatively, the at least two supporting layers 2 may also be an integrally-formed structure. The integrally-formed structure is applicable to the supporting layer solutions given in the above-mentioned embodiments, and is especially suitable for the above-mentioned embodiment solution in which the hollowed-out parts of the supporting layers are alternately arranged, because it is necessary to avoid the dislocation between layers as much as possible to ensure the complementarity of the patterns of the hollowed-out regions in the solution in which the hollowed-out parts of the supporting layers are alternately arranged.

Of course, exemplarily, the adjacent supporting layers 2 may not be connected, and the freedom of each supporting layer 2 is maintained to obtain the better tensile performance.

Furthermore, embodiments of the present application further provide a display device including the display assembly described in any one of the above embodiments.

In the display assembly provided by the embodiments of the present application, the flexible display module may include a flexible display screen, structures such as a protective cover plate and a protective film located on the front of the display screen, and structures such as a heat dissipation module located on the back of the display screen.

Exemplarily, the non-display region at the edge of the protective cover plate may be fitted to the edge of the bearing assembly through the foam glue. Taking the foldable display assembly as an example, since the rotating shaft assembly separates the first middle frame from the second middle frame, the edges of the first middle frame and the second middle frame may be respectively fitted to the edge of the protective cover plate through the "C"-shaped foam glue.

For example, the flexible display screen may be an OLED panel.

The display device provided by the embodiments of the present application may further include a rear case, a main circuit board and other functional modules, etc., located on the side of the bearing assembly away from the flexible display module, which will not be described here.

For example, the display device may be applied to display equipment such as tablet computer, mobile phone, etc.

It should be noted that, in some embodiments of the disclosure, the display assembly and the display device may further include other structures, which may be determined according to actual requirements and are not limited in the embodiments of the disclosure. Furthermore, the selections of sizes and materials of the structures provided in the embodiments of the disclosure are not limited to the above-mentioned embodiments, and the basic requirements can refer to the above descriptions, which will not be repeated here. Moreover, the drawings of the present application are only schematic diagrams, and the dimensions and proportions of the structures in the drawings do not represent actual dimensions and proportions of the structures.

Evidently those skilled in the art can make various modifications and variations to the embodiments of the present application without departing from the spirit and scope of the present application. Thus the present application is also intended to encompass these modifications and variations therein as long as these modifications and variations to the present application come into the scope of the claims of the present application and their equivalents.

What is claimed is:

1. A display assembly, comprising:
   a bearing assembly configured to bear a flexible display module and drive the flexible display module to bend or fold;
   at least two supporting layers stacked in sequence on the bearing assembly, wherein each supporting layer is bendable and has resilience, and each supporting layer is provided with a hollowed-out pattern; and hollowed-out patterns of the supporting layers are different in at least one of following properties: an area of a hollowed-out part, a shape of the hollowed-out part, and a position of the hollowed-out part; and
   the flexible display module located on a side of the at least two supporting layers away from the bearing assembly;
   wherein the hollowed-out pattern of each supporting layer comprises at least one hollowed-out region;
   the hollowed-out region comprises a plurality of hollowed-out parts distributed in an array.

2. The display assembly of claim 1, wherein areas of hollowed-out parts in the supporting layers are different.

3. The display assembly of claim 2, wherein the areas of the hollowed-out parts in the supporting layers increase sequentially in a direction from an inner side to an outer side of bending or folding of the flexible display module.

4. The display assembly of claim 3, wherein hollowed-out parts in one supporting layer correspond to hollowed-out parts in another supporting layer in an one-to-one correspondence, and orthographic projections of hollowed-out parts corresponding to each other on the flexible display module at least partially overlap.

5. The display assembly of claim 4, wherein centers of the orthographic projections of the hollowed-out parts corresponding to each other on the flexible display module coincide.

6. The display assembly of claim 4, wherein an orthographic projection of a hollowed-out part of a supporting layer close to the inner side of bending or folding on the flexible display module is located in an orthographic projection of a hollowed-out part of a supporting layer close to the outer side of bending or folding on the flexible display module.

7. The display assembly of claim 1, wherein orthographic projections of hollowed-out parts in the supporting layers on the flexible display module are staggered.

8. The display assembly of claim 7, wherein shapes and areas of the hollowed-out parts in the supporting layers are same.

9. The display assembly of claim 1, wherein shapes of hollowed-out parts in the supporting layers are same; and the shapes of the hollowed-out parts are a strip shape;
   wherein an extending direction of the strip shape is consistent with an axis direction of bending or folding of the flexible display module.

10. The display assembly of claim 1, wherein shapes of hollowed-out parts in the supporting layers are different; and the shapes of the hollowed-out parts comprise at least one of strip shape, rectangle, rhombus, or oval.

11. The display assembly of claim 1, further comprising:
    a foam adhesive layer located between the at least two supporting layers and the flexible display module, wherein one supporting layer close to the flexible display module is fitted to the flexible display module through the foam adhesive layer;
    wherein one supporting layer close to the bearing assembly is fitted to the bearing assembly through glue.

12. The display assembly of claim 11, wherein adjacent supporting layers are fitted through glue, or the at least two supporting layers are an integrally-formed structure.

13. The display assembly of claim 1, wherein the bearing assembly comprises:
a first middle frame,
a second middle frame, and
a rotating shaft assembly located between the first middle frame and the second middle frame,
wherein the first middle frame and the second middle frame are rotatable respectively around the rotating shaft assembly to realize folding or unfolding.

14. The display assembly of claim 13, wherein a thickness of each supporting layer is 0.01 mm-0.15 mm.

15. The display assembly of claim 1, wherein each supporting layer is a stainless steel material layer.

16. A display device, comprising the display assembly of claim 1.

17. The display assembly of claim 7, wherein shapes of hollowed-out parts in the supporting layers are same; and the shapes of the hollowed-out parts are a strip shape;
wherein an extending direction of the strip shape is consistent with an axis direction of bending or folding of the flexible display module.

18. The display assembly of claim 7, wherein shapes of hollowed-out parts in the supporting layers are different; and the shapes of the hollowed-out parts comprise at least one of strip shape, rectangle, rhombus, or oval.

19. The display assembly of claim 1, wherein the at least two supporting layers are two supporting layers.

* * * * *

UNITED STATES PATENT AND TRADEMARK OFFICE
CERTIFICATE OF CORRECTION

| | | |
|---|---|---|
| PATENT NO. | : 12,259,756 B2 | Page 1 of 1 |
| APPLICATION NO. | : 17/921604 | |
| DATED | : March 25, 2025 | |
| INVENTOR(S) | : Pengfei Zhou et al. | |

It is certified that error appears in the above-identified patent and that said Letters Patent is hereby corrected as shown below:

On the Title Page

Item (30) should read:
Foreign Application Priority Data
Aug. 27, 2020 (CN) ..................... 202010876795.8

Signed and Sealed this
Thirteenth Day of May, 2025

Coke Morgan Stewart
*Acting Director of the United States Patent and Trademark Office*